(12) United States Patent
Glatt et al.

(10) Patent No.: US 8,588,443 B2
(45) Date of Patent: Nov. 19, 2013

(54) HEARING SYSTEM WITH NETWORK TIME

(75) Inventors: Raoul Glatt, Zurich (CH); Micha Knaus, Jona (CH); Rolf Laich, Rüti (CH)

(73) Assignee: Phonak AG, Stafa (CH)

( * ) Notice: Subject to any disclaimer, the term of this patent is extended or adjusted under 35 U.S.C. 154(b) by 1391 days.

(21) Appl. No.: 11/383,508

(22) Filed: May 16, 2006

(65) Prior Publication Data

US 2007/0269049 A1 Nov. 22, 2007

(51) Int. Cl.
*H04R 25/00* (2006.01)

(52) U.S. Cl.
USPC ............... 381/315; 381/314; 700/14; 700/16; 368/47

(58) Field of Classification Search
USPC .................. 381/314–315; 368/47; 700/14, 16
See application file for complete search history.

(56) References Cited

U.S. PATENT DOCUMENTS

| | | | |
|---|---|---|---|
| 5,479,522 A * | 12/1995 | Lindemann et al. | 381/23.1 |
| 6,223,050 B1 * | 4/2001 | Roberts, Jr. | 455/425 |
| 6,774,795 B2 * | 8/2004 | Eshelman et al. | 340/573.1 |
| 6,870,940 B2 * | 3/2005 | Meyer et al. | 381/314 |
| 7,239,626 B2 * | 7/2007 | Kandala et al. | 370/349 |
| 7,295,121 B2 * | 11/2007 | Aceti | 340/573.1 |
| 7,409,022 B2 * | 8/2008 | Dai et al. | 375/354 |
| 7,457,200 B2 * | 11/2008 | Pikula et al. | 368/10 |
| 7,561,892 B2 * | 7/2009 | Huh et al. | 455/518 |
| 7,778,432 B2 * | 8/2010 | Larsen | 381/315 |
| 7,844,062 B2 * | 11/2010 | Bauml et al. | 381/312 |
| 2002/0044669 A1 * | 4/2002 | Meyer et al. | 381/314 |
| 2002/0131613 A1 | 9/2002 | Jakob | |
| 2004/0028071 A1 * | 2/2004 | Gehring et al. | 370/442 |
| 2004/0190737 A1 * | 9/2004 | Kuhnel et al. | 381/312 |
| 2007/0009124 A1 * | 1/2007 | Larsen | 381/315 |
| 2007/0133832 A1 * | 6/2007 | DiGiovanni et al. | 381/320 |

FOREIGN PATENT DOCUMENTS

| | | |
|---|---|---|
| DE | 10048341 C1 | 9/2002 |
| EP | 1395007 A1 | 3/2004 |
| EP | 1445982 A1 | 8/2004 |
| EP | 0657958 A1 | 6/2005 |
| EP | 1624723 A2 | 2/2006 |
| WO | 02/07479 A1 | 1/2002 |
| WO | 03/091877 A2 | 11/2003 |
| WO | 2004/110099 A2 | 12/2004 |
| WO | 2005/024785 A1 | 3/2005 |

OTHER PUBLICATIONS

European Search Report, EP06114027, Oct. 31, 2006.

* cited by examiner

*Primary Examiner* — Curtis Kuntz
*Assistant Examiner* — Ryan Robinson
(74) *Attorney, Agent, or Firm* — Pearne & Gordon LLP

(57) ABSTRACT

The method of operating a hearing system comprising at least two devices comprises the step of establishing a common network time among said at least two devices. Said at least two devices can be provided with information on the number of network time units that passed since a time zero point of said common network time. Information on the common network time can be communicated from one device to another device. A wireless link can be used for establishing said common network time. The common network time not only allows for a precise synchronization of events within the hearing system, but also for ordering and sequencing events. A priorization of events, like tasks and actions, is enabled, based on the common network time. Doubly-received or obsolete commands can be recognized and deleted, and tasks can be scheduled.

27 Claims, 2 Drawing Sheets

HEARING SYSTEM WITH NETWORK TIME

TECHNICAL FIELD

The invention relates to a hearing system and to a method of operating a hearing system. A hearing system comprises at least two devices, at least one of which is a hearing device. Under "hearing device", a device is understood, which is worn in or at least adjacent to an individual's ear, with the object to improve or enable the individual's acoustical perception, regardless of whether the individual's perception is impaired or not. This may even be achieved by barring acoustic signals from being perceived, in the sense of hearing protection for the individual. Accordingly, the hearing device may be, e.g., a hearing aid, worn in or near the ear or implanted, a headphone, an earphone, a hearing protection device, a communication device or the like. The hearing system may, in particular, be a binaural hearing system comprising two hearing devices, in particular two hearing aids.

BACKGROUND OF THE INVENTION

In hearing systems, it can be desirable to provide for some kind of synchronization between the different devices of the system.

From US 2002/0131613, a pair of hearing devices forming a set of binaural hearing devices is known. A communication link between the two hearing devices is established by two electric conductors, wherein one conductor is established by the individual's body and another conductor is established by a wire. Each of the hearing devices comprises a time control unit, both of which are synchronized via said link. Each time control unit operates a controlled time-multiplexer, so as to repeatedly switch from a first time frame to a second time frame and back, i.e., time frame 1->time frame 2->time frame 1->time frame 2 and so on. During time frame 1, digitized output of the left microphone is led, simultaneously with digitized output of the right microphone, to the input of the right DSP. And vice versa, in time frame 2, digitized output of the right microphone is led, together with digitized output signal of the left microphone, to the input of the left DSP.

It is desirable to provide for an improved way of achieving synchronization in a hearing system.

Besides, from DE 100 48 341 C1, a hearing device is known, which can receive, when positioned close to an external sender, a sender-specific signal, e.g., a DCF77 signal. In said hearing device, hearing program changes can be automatically changed in dependence of such a DCF77 signal, so that, in dependence of the time of the day, an automatic selection of a pre-determined hearing program may be accomplished.

SUMMARY OF THE INVENTION

A goal of the invention is to create a hearing system and a method of operating a hearing system, that provide for an improved way of achieving synchronization in the hearing system.

An object of the invention is to provide for an increased reliability in the communication within a hearing system.

Another object of the invention is to provide for an increased flexiblilty in timing events within the hearing system.

Another object of the invention is to provide for an increased precision in the synchronization of events within the hearing system.

Another object of the invention is to improve the handling of a hearing system with synchronization.

Another object of the invention is to facilitate the operation of a hearing system with synchronization.

These objects are achieved by a hearing system and by a method of operating a hearing system according to the patent claims.

The method of operating a hearing system comprising at least two devices comprises the step of a) establishing a common network time among said at least two devices.

The corresponding hearing system comprises at least two devices and means for establishing a common network time among said at least two devices.

Through establishing said common network time, the above-mentioned goals and objects can be achieved.

A common network time provides not only for some synchronism, but provides for an orientation (or sense of direction) in time. Therefore, a common network time not only allows for a precise synchronization (of events), but also for ordering (sequencing) events. A priorization of events (like tasks and actions) is enabled, based on the common network time.

Said establishing said common network time can be understood as providing the at least two devices with the current network time.

Usually, the devices of the hearing system are functionally interconnected with each other, at least pair-wise functionally interconnected. The functional interconnection is usually embodied by a wireless link.

The method may comprise the step of k) transmitting, by a first of said at least two devices, information on the current network time.

Said transmitting (sending) is a transmitting (sending) to at least one other of the devices of the hearing system, usually to all other devices of the hearing system. This allows to distribute the common network time within the hearing system.

In the corresponding hearing system, said means comprise, in at least a first of said at least two devices, a transmitter adapted to transmitting information on the current network time.

The method may furthermore comprise the step of l) receiving, by at least one other of said at least two devices, said information on the current network time.

Accordingly, said other device can pick up information on the common network time from another device of the hearing system.

In the corresponding hearing system, said means comprise, in at least one other of said at least two devices, a receiver adapted to receiving said information on the current network time.

Typically, a common network time has a defined time zero point, to which it refers, and has a monotonously rising value. The network time zero point may, numerically, be equal to zero, but it may as well be different from zero; it is just a reference for the network time, to which current network times, which are dealt with in the hearing system, may refer. Accordingly, the network time zero point could also be named "network time reference point".

The common network time may be given in ordinary time units, like hours, minutes and seconds, or in seconds only, or in other (network) time units, e.g., given by an the duration of a period of an oscillator. The common network time may be derived from outside the hearing system, e.g., from the internet or from a time signal provided via radio signals, e.g., like those used for some clocks and watches. The common network time may be generated within the hearing system.

Said establishing said common network time among said at least two devices may be implemented or understood as providing said at least two devices with information on the number of network time units that passed since a time zero point of said common network time. Said information on the number of network time units that passed since said time zero point may just allow to obtain said number, or may (directly) comprise said number. It is possible to foresee a network protocol for the communication among the devices of the hearing system, and to include information on the network time in said network protocol. This way, the network time may be established via said network protocol.

Said hearing system may be considered a hearing instrument system.

Said hearing system may be considered a network of devices comprising at least one hearing device.

A hearing system may comprise (as part of said means), in at least one of said at least two hearing devices, a receiver for receiving information on said common network time.

A typical hearing device comprises an input transducer (typically for transducing incoming acoustical sound into audio signals) and an output transducer (typically for transducing audio signals into signals to be perceived by the user of the hearing device, typically outgoing acoustical sound) and a signal processor functionally interconnected between said input and said output transducer for processing audio signals (typically for adjusting the hearing device to the user's needs and preferences).

In one embodiment of the method, step a) and/or step b) and/or step k) and/or step l) (and/or other communication steps described below) is carried out via a wireless link, e.g., an inductive link. It is also possible to use a wire-bound link. It is possible to use, e.g., any kind of electromagnetic links, e.g., radio frequency links, frequency-modulated links, and it is possible to use bluetooth or other connections known, e.g., from computer technology.

Accordingly, said means for establishing said common network time within the hearing system may comprise a communication link, in particular a wireless link, functionally interconnecting said at least two devices.

It is possible to provide at least one of said at least two devices upon its boot-up (during its booting time) with the current network time or when it starts to receive messages from another device of the hearing system.

It is possible to (also) provide at least one of said at least two devices with the current network time frequently during its operation, in particular periodically. E.g., each time another network time unit has passed, the current network time can be sent to said at least one of said at least two devices. Note, that not only the information, that another network time unit has passed (embodied, e.g., as a simple impulse), is sent, but that the current network time (information on the number of network time units that passed since the network time zero point) is sent, e.g., "4383 network time units" (since system start-up) or "14 h, 22 min, 18 sec".

In another embodiment, the method comprises the steps of
e) receiving, in at least one of said at least two devices, the current network time; and
f) using an internal clock of said at least one device for generating time information at least approximately indicating the current network time.

This allows for less frequent communication (transmitting/receiving the current network time) while nevertheless maintaining a good synchronization and high-quality network time.

Said time information is indicative of the current network time, and it agrees with it the better, the more precise said internal clock is in agreement with a clock or timepiece used for deriving the common network time. The precision of the so-obtained common network time depends on how often step e) is performed and on the tuning and the stability of said internal clock.

Said internal clock may be as simple as an impulse generator or oscillator, and it may, by itself, "be unaware" of the current network time.

By means of said internal clock, it is possible to perform step e) only occasionally (periodically, possibly with varying period, possibly dependent on identified discrepancies between said time information and the common network time). Said time information is, in other words, an extrapolation from a received current network time to further current network times.

The corresponding hearing system comprises, in at least one of said at least two devices, an internal clock for generating time information at least approximately indicating the current network time.

Each device of the hearing system may comprise an internal clock.

Besides steps e) and f), the method may furthermore comprise the step of
g) resynchronizing, after step f), to the common network time upon again receiving the current network time in said at least one device.

In one embodiment, the method comprises the step of
h) generating said common network time within said hearing system.

In the corresponding hearing system, said means comprise, in at least one of said at least two hearing devices, a timepiece for generating said common network time.

This makes the hearing system independent from external reference time signals. When said common network time is generated within the hearing system, the hearing system functions properly, wherever it is currently located and does not depend on the availability of suitable external reference time signals, which are not everywhere available. And furthermore, the devices of the hearing system do not need receivers for receiving externally-generated signals and may work with receivers for system-internal communication only.

In another embodiment, the method comprises the step of
i) receiving information on said common network time from a reference time base external to said hearing system.

In the corresponding hearing system, said means comprise a receiver for receiving information on said common network time from a reference time base external to said hearing system.

This frees the hearing system from the need for generating said common network time by itself.

It can be advantageous to foresee that not each device of the hearing system comprises a receiver for receiving information on said common network time from a reference time base external to said hearing system; in particular, such a receiver may be provided in only one of the devices of the hearing system. In that case, the hearing system comprises only a small number (in particular only one) of such receivers, which allows for a small-size and cost-effective design of the hearing system and its devices. A device capable of receiving said information on the externally-generated common network time may pass this information (or information derived therefrom) to other devices of the hearing system, via the link, which interconnects the devices of the hearing system, as has been described above.

The invention has remarkable advantages when (some or even all) messages communicated within the hearing system are provided with a network time reference, i.e., an information on time referring to the common network time:

The method may comprise the step of m) transmitting, by a first of said at least two devices, a message comprising a network time reference.

This allows for identification and ordering/sorting of messages (or corresponding commands).

And the method may furthermore comprise the step of n) receiving, by at least one other of said at least two devices, said message.

Said message may comprise, in addition to said network time reference, a command.

In one embodiment, said network time reference is a time reference for identifying said message, in particular a network time reference, which indicates the point in time of generation of said message or of said transmitting (sending) of said message.

This is like providing messages (or corresponding commands) with a time stamp (or time marker). It is possible, e.g., to recognize doubly-received commands and eliminate one of them, and it is possible to recognize commands that meanwhile became obsolete and delete those.

In one embodiment, said network time reference indicates a point in time, at which said command is to be executed. This allows to schedule tasks and to provide for latency-free synchronization.

These two embodiments may, of course, be combined, so that in a message, a command is provided with two (or even more) time references.

Said transmitting (sending) of said messages may be carried out in form of broadcasting. I.e., a device transmitting (sending) the message does not transmit (send) the message to specific devices, and it does not receive a reply by a device (successfully) receiving the message. Nevertheless, said transmitting may take place such, that a device transmitting a message resends said message a number of times, unless it receives a reply from at least one other device of the hearing system that has received said message.

Usually, said common network time will be established among all devices of the hearing system (or most of them).

Usually, said communication link will functionally connect all devices of the hearing system (or most of them).

Usually, all devices will be provided (at their respective start-up and/or later during operation) with the current network time, with the exception of the device generating the common network time (if the common network time is generated within the hearing system).

In one embodiment of the hearing system, at least one of said at least two devices is a hearing aid.

In one embodiment of the hearing system, the hearing system is a binaural hearing system.

The advantages of the methods correspond to the advantages of corresponding apparatuses.

Further preferred embodiments and advantages emerge from the dependent claims and the figures.

BRIEF DESCRIPTION OF THE DRAWINGS

Below, the invention is described in more detail by means of examples and the included drawings. The figures show schematically.

The reference symbols used in the figures and their meaning are summarized in the list of reference symbols. Generally, alike or alike-functioning parts are given the same or similar reference symbols. The described embodiments are meant as examples and shall not confine the invention.

DETAILED DESCRIPTION OF THE INVENTION

Figure 1:
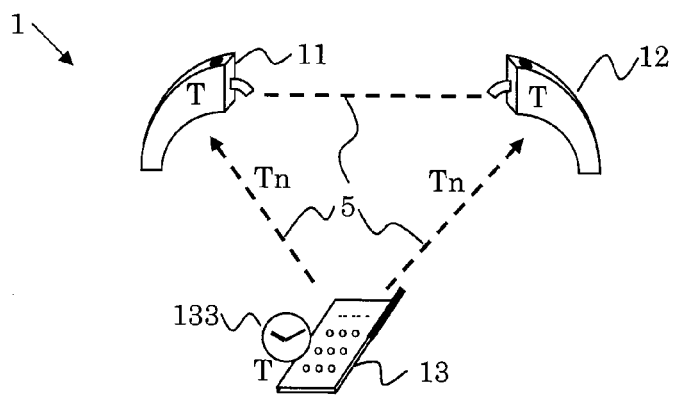
FIG. 1 a hearing system with internally-generated common network time.

FIG. 1 schematically shows a hearing system 1 with internally-generated common network time T. Furthermore, it schematically shows a hearing system 1 comprising devices 11,12, which do not need internal clocks.

The hearing system comprises three devices 11,12,13, all of which are interconnected by a communication link 5, e.g., a wireless link. Devices 11 and 12 are hearing devices, which form a set of binaural hearing devices. Device 13 is a remote control 13. The remote control 13 comprises an internal timepiece 133 (indicated as a schematical clock), which may be a clock in the conventional sense or, as well, another source of ordered time units with a reference point (network time zero point), e.g., an electrical oscillating circuit or quartz oscillator, with a counter or the like.

In regular (or irregular) time intervals, device 13 sends (transmits) the current network time Tn via said communication link 5 to the other devices 11,12, e.g., by broadcasting. The corresponding synchronization message may, e.g., report that the current network time is "2 hours, 18 minutes and 34 aseconds", or just "362 time units", in any case, the time information relates to a time zero point of the common network time T. The latter case (sending the number of passed time units) is illustrated in FIG. 2.

Figure 2:
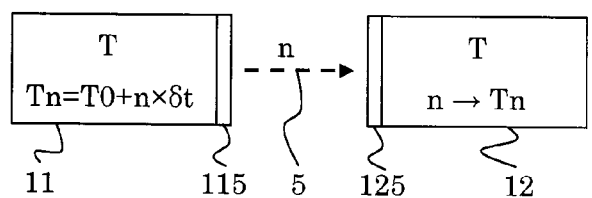
FIG. 2 a diagram illustrating communication of the current network time.

FIG. 2 shows a diagram illustrating a way of communicating the current network time Tn, i.e., the information used for distributing the common network time throughout the hearing system 1. The hearing system 1 of FIG. 2 comprises two devices 11,12. Device 11 generates the common network time Tn as Tn=T0+n×δt, wherein T0 denotes the network time zero point, δt denotes the network time unit (e.g., seconds or oscillator periods) and n is the number of network time units that passed since the network time zero point T0. It is sufficient to communicate the number n over the communication link 5 to device 12. For communication, device 11 comprises a transmitter (or sender) 115, and device 12 comprises a receiver 125. Internally, it can be dealt with the number n, or Tn can be deduced from n. Coming back to FIG. 1, the sending (and receiving) of the current network time Tn will usually take place rather frequently, typically in intervals of one (or a number of) network time units δt. It is, on the other hand, possible to distribute Tn only or mainly or additionally at specific events, e.g., when a command is transmitted via the communication link.

Figure 3:
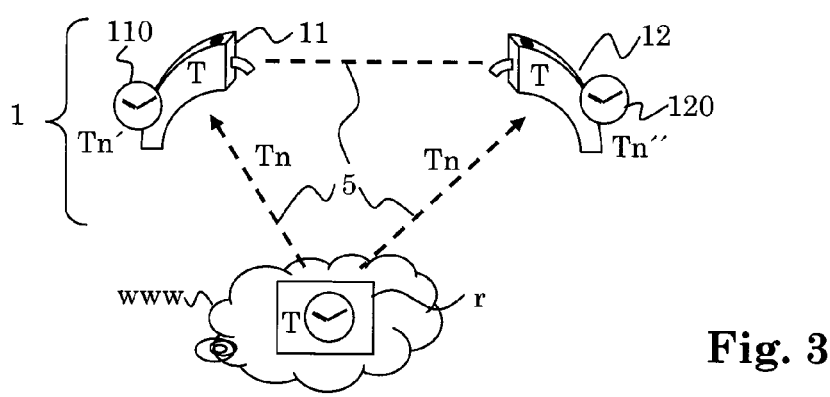
FIG. 3 a hearing system with externally-generated common network time.

FIG. 3 schematically shows a hearing system 1 with externally-generated common network time T. Furthermore, FIG. 3 schematically shows a hearing system 1 comprising devices 11,12, which contain internal clocks 110,120. This makes it possible to communicate Tn far less frequently than in the example of FIG. 1, and yet maintain a good synchronization in the hearing system 1.

In FIG. 3, the network time T is received from outside the hearing system 1, e.g., from the internet (www), which comprises a reference time base r, or via a radio-signal like the DCF77-signal provided in central Europe (for controlling radio-controlled clocks and watches). The hearing system 1 (in the illustrated case: both devices 11,12) receives the common network time T via the communication link 5. It is also possible to foresee the communication link 5 only for hearing system-internal communication and provide for another communication link for accessing the externally generated common network time T. The current network time Tn may be encoded in any way, e.g., like in the examples above, as a time in usual time units or in form of the number n.

Due to said internal clocks 110,120, an occasional transfer of information on the common network time T is sufficient.

Said internal clocks 110,120 extrapolate from a received Tn value. Since such internal clocks never work perfectly (temperature drifts, manufacturing tolerances and the like), an occasional resynchronization should to be carried out in order to maintain a good precision of the common network time within the hearing system 1.

Figure 4:
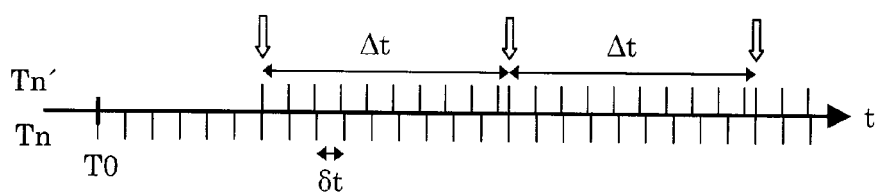
FIG. 4 a diagram illustrating resynchronization of the common network time.

FIG. 4 shows a diagram illustrating the corresponding resynchronization of the common network time T, as it might take place for device 11 of FIG. 3. The generator of the common network time (in FIG. 3, the external reference time base r in the internet), produces regularly spaced signals with the time interval δt (network time unit). In time intervals Δt, the current network time Tn is broadcasted, typically, Δt=m×δt with m being an integer (typically of the order of $10^2$ to $10^5$). Typically during booting, device 11 receives a first synchronization signal, indicated by the left-most open arrow. From then on, device 11 generates, by means of its internal clock 110, time information Tn', which shall represent the current network time as well as possible. I.e., device 11 extrapolates from the synchronization signal towards further Tn. In FIG. 4, Tn' is a little bit faster than Tn. After the time intervals Δt, another Tn-sychronization signal is received by device 11, and, for at least a moment, full synchronization of device 11 with the common network time T can be achieved again.

The establishment of a common network time T in a hearing system 1 has remarkable advantages over a simple synchronization. In a simple synchronization, impulses or signals in different devices are made to occur at the same moment in time; a clock cycle, sometimes also named system clock, is made available within the system. The establishment of a common network time T, however, provides for more information, since different moments in time are labelled with different time stamps (the current network time Tn), which allows to distinguish them from each other and to detect shifts or time differences and to sort or sequence events, like commands.

After FIGS. 1 to 4 illustrated ways of establishing a common network time T, FIGS. 5 to 8 now illustrate exemplary situations, in which a common network time T has been established, and in which the common network time T has remarkable advantages over a simple synchronization. These advantages are achieved by attaching at least one network time reference to a command.

Figure 5:
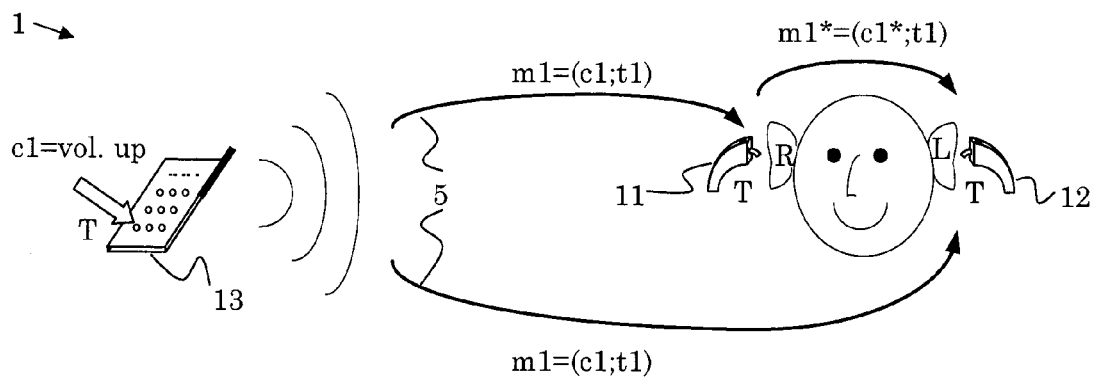
FIG. 5 an illustration of a case with elimination of twice-received commands.

FIG. 5 shows an illustration of a case with elimination of twice-received commands. The hearing system 1 comprises, like FIG. 1, a remote control 13 and two hearing devices 11,12 forming a set of binaural hearing devices. The user of the hearing system 1 presses a button on the remote control 13 (indicated by the open arrow), for increasing the volume by one step (e.g. +3 dB). This provokes a communication over the communication link 5. A message m1 is communicated, which not only comprises a command c1 for increasing the volume by one step, but also a network time reference (or time stamp) t1, which may be indicating the time of sending the message m1.

Furthermore, it may be foreseen that the devices 11,12 replicate messages, which they receive, by sending a replica of the received message. This is of specific advantage when the communication is carried out as broadcasting.

Such a replication/forwarding mechanism can be foreseen, in order to extend the range over which the remote control 13 can be used. In addition, the replication mechanism may improve the reliability of a hearing system 1, since the effect of an interruption of the communication link between the remote control 13 and one of the devices 11,12 can be overcome, if at least the communication link connecting the two devices 11,12 is still working. This kind of hopping communication is in more detail described in the patent application publication EP 1 657 958 A1 of the same applicant, to be published on May 17, 2006. Therefore, said EP 1 657 958 A1 (European application number 05 013 793.4) is herewith incorporated by reference in this application.

For reasons of clarity, in FIG. 5, only the replication of message m1 by device 11 is illustrated and will be discussed.

Now, m1 is received by device 11, so that the requested one-step (+3 dB) volume change can be carried out. But device 12 will receive m1 and, sent by device 11, the replica m1*. Incoming commands for the devices in the hearing system 1 are put onto a stack, as depicted in the table below; the command stacks of the devices 11,12 may look like this:

|  | R (device 11) | L (device 12) |  |
|---|---|---|---|
| command$_1$ | c1 [t$_1$] | c1 [t$_1$] |  |
| command$_2$ | ... | ~~c1 [t$_1$]~~ | delete |
| command$_3$ | ... | ... |  |

Device 12 receives two times the command to increase the volume by one step. Without further processing or intelligence, device 12 would increases the volume by two steps, i.e., by +6 dB, whereas device 11 would, correctly, increase the volume by only one step (+3 dB).

Therefore, it is advisable to foresee that each device 11,12 works through its command stack and eliminates commands that carry identical network time references ti. The replica of m1 (and of c1) can be identified and, as indicated in the table, be deleted. For the given volume step example, both devices 11,12 will execute c1 exactly once, resulting in a +3 dB volume on either side. An unwanted double-execution of commands is successfully avoided.

If the user had toggled the volume-up switch twice, in order to increase the volume by two steps, two messages with different time stamps would have been sent by the remote control 13, and, despite of the replica-sending, the appropriate volume changes would have been carried out in either of the devices 11,12.

Also the case that the original message m1 had not reached device 12, but the replica m1* of m1 generated and sent by device 11 had been received by device 12, would be handled correctly.

Figure 6:
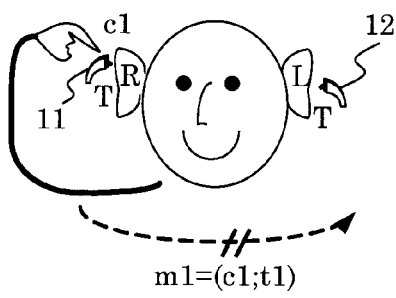
FIG. 6 an illustration of a case with elimination of obsolete commands (first part)
Figure 7:
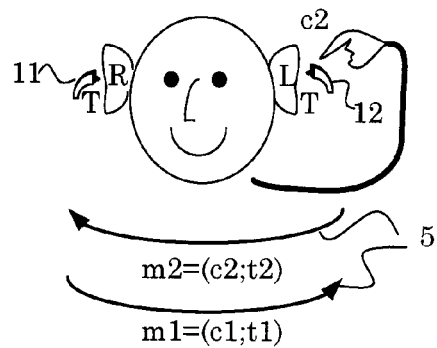
FIG. 7 an illustration of a case with elimination of obsolete commands (second part)

FIGS. 6 and 7 illustrate a case with elimination of obsolete commands, which may come about when the communication link connecting the devices is unstable (occasionally interrupted). The hearing system comprises a set of binaural hearing devices 11,12. In this hearing system, the sending (transmitting) of messages is not carried out in form of a simple broadcasting, but the sender expects to receive an indication from a receiving hearing device indicating that a message has been received, and resends messages a number of times if no such indication is received. If, after a certain time span, no such indication is received, no further attempts of resending are made, and commands contained in the message are not executed in any of the hearing devices.

In FIG. 6, the user tries, at the right hearing device 11, to toggle programs, i.e., he uses the toggle switch of the right hearing device 11 for selecting the next hearing program. For synchronizing the left hearing device 12 with hearing device 11, hearing device 12 sends a message m1, which comprises a command c1 for selecting the next hearing program and, in addition, a network time reference (or time stamp) t1, which may be indicating the time when the user toggled. Unfortunately, the link connecting the two hearing device 11,12 is temporarily down, e.g., due to interfering external electromagnetic signals. Accordingly, the message m1 is not received by hearing device 12, and consequently, hearing device 11 does not receive an indication that the message m1 has been received by hearing device 12. So, the requested program change occurs in neither of the hearing devices 11,12.

Then the user recognizes that the hearing devices 11,12 did not change programs and uses thereupon, as shown in FIG. 7, thereupon the toggle switch of the left hearing device 12 for selecting the next hearing program. This leads to the generation of a message m2, which comprises a command c2 for selecting the next hearing program and, in addition, a network time reference (or time stamp) t2, which may be indicating the time when the user toggled the described second time.

By coincidence, in the mean time, the link 5 has re-established again, thus enabling the communication between the hearing devices again. Hearing device 11 receives said message m2 and is still resending message m1, so that, with the link up again, m1 is received by hearing device 12.

Accordingly, the command stacks of the devices 11,12 may look like this:

|  | R (device 11) |  | L (device 12) |  |
|---|---|---|---|---|
| command$_1$ | c1[t1] | delete | c2 [t$_2$] |  |
| command$_2$ | c2 [t$_2$] |  | c1[t1] | delete |
| command$_3$ | ... |  | ... |  |

Hearing device 11 has two times a command indicating to change to the next hearing program, once from toggling its own program toggle switch (at time t1), and once from toggling at hearing device 12 (at time t2), as received via the link 5. Hearing device 12 has two times a command indicating to change to the next hearing program, too: once from toggling its own program toggle switch (at time t2), and once from a resending attempt from hearing device 11 dating back to the toggling at hearing device 11 (at time t1). Without further processing or intelligence, both devices 11,12 would change to the over-next program instead of to the next program, as desired.

Therefore, it is advisable to foresee that each device 11,12 works through its command stack and eliminates commands that are obsolete. This can be judged from the time stamps. That version of two alike commands, which has the older time stamp, shall be deleted (if the difference in time between the time stamps is smaller than the time span during which resending of messages is attempted). In the depicted case, command c1 (from time t1) will be deleted from device's 12 command stack and from device's 11 command stack.

Note, that indications of reception of messages are not drawn in the figures.

Figure 8:
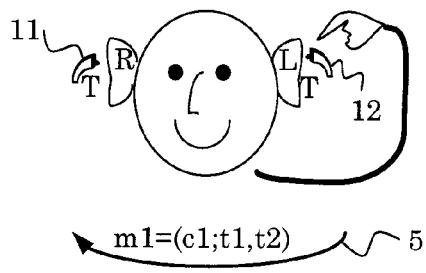
FIG. 8 an illustration of a case with transfer of a message containing a network time reference indicating the point in time at which a command shall be executed.

FIG. 8 shows an illustration of a case with transfer of a message containing a network time reference indicating the point in time at which a command shall be executed. The hearing system in FIG. 8 comprises two devices 11,12.

Frequently, an acoustic acknowledge signal is assigned to actions done to a hearing system. Typical examples of such actions are: changing the volume, changing the hearing program, alarm indicating low battery (battery end-of-life alarm).

For a binaural hearing system, the user usually expects the acoustic aknowledge signals to appear synchronized on both sides. A network time reference can be used to precisely control the synchronization.

In FIG. 8, the user toggles the program change switch. This will lead to the generation of a command c1 with a time stamp t1 and another network time reference t2, all combined in a message m1. Like in the examples above, t1 may be the point in time at which the command c1 is generated or at which the message m1 is sent. At the point in time t2, which is deliberately chosen to be later than t1, the acknowledge signal shall be played to the user, whereas the program change shall take place as soon as possible in both devices 11,12. So, in both devices, a program change is carried out very quickly. A high-precision synchronization thereof is usually not particularly important. But the acknowledge sound will be played, with high precision, at the very same time (t2) in both devices 11,12. The network time reference t2 may in particular be chosen such, that the devices have enough time to settle into a stable state after the program change. Without the network time reference t2, the two acknowledge signals are very unlikely to appear sufficiently synchronously, since transferring the commands over the link is subject to latency.

In the situation/example of FIG. 8, there can also be two separate messages be produced: one for the (immediate) program change, and one for the acknowledge sound to be played at the later point in time t2.

Another way to deal with the situation/example of FIG. 8, which also has the same effect as the other two described ways, is that one message is produced, which contains the toggle (program change) command and also the acoustic aknowledge command, thus m1=(toggle[t1];ackn[t2]). Command stacks of the devices 11, 12 may look like this:

|  | R (device 11) | L (device 12) |
|---|---|---|
| command$_1$ | toggle [t1] | toggle [t1] |
| command$_2$ | ackn [t2] | ackn [t2] |
| command$_3$ | ... | ... |

As has ben shown by means of the various examples and embodiments above, the common network time T not only allows to let program changes, volume changes or acknowledge signals and the like occur simultaneously in each hearing device of a set of binaural hearing devices, but also improves the management of commands and the reliability of the hearing system.

| List of Reference Symbols | |
|---|---|
| 1 | hearing system |
| 11 | device, hearing device |
| 110 | clock, internal clock |
| 115 | transmitter |
| 12 | device, hearing device |
| 120 | clock, internal clock |
| 125 | receiver |
| 13 | device, remote control |
| 133 | timepiece, internal timepiece |
| 5 | wireless link, communication link |
| ci | command |
| L | left |
| mi | message |
| n | number of network time units that passed since the network time zero point |
| r | (external) reference time base |
| R | right |
| ti | network time reference |
| T | common network time |
| Tn | current network time |
| Tn', Tn" | time information |
| T0 | network time zero point |
| δt | network time unit |
| Δt | time interval |
| www | internet |

The invention claimed is:

1. Method of operating a binaural hearing system comprising at least two devices, said method comprising the step of
   a) establishing a common network time among said at least two devices wherein at least one of said at least two devices is a hearing device; and thereafter
   m) transmitting, by a first of said at least two devices, a message, which message comprises a network time reference that refers to a specific point in time of said common network time and, in addition, a command to be executed by the hearing device, and
      wherein said network time reference indicates a point in time at which said command is to be executed by said hearing device.

2. Method according to claim 1, comprising the step of
   k) transmitting, by a first of said at least two devices, information on the current network time.

3. Method according to claim 2, comprising the step of
   l) receiving, by at least one other of said at least two devices, said information on the current network time.

4. Method according to claim 1, comprising the step of
   b) providing said at least two devices with information on the number of network time units that passed since a time zero point of said common network time.

5. Method according to claim 1, wherein the step of establishing a common network time among said at least two devices is carried out via a wireless link.

6. Method according to claim 1, comprising the step of
   c) providing at least one of said at least two devices with the current network time during its boot-time or when it starts to receive messages from another device of the binaural hearing system.

7. Method according to claim 1, comprising the step of
   d) providing at least one of said at least two devices with the current network time frequently during its operation.

8. Method according to claim 1, comprising the steps of
   e) receiving, in at least one of said at least two devices, the current network time; and
   f) using an internal clock of said at least one device for generating time information at least approximately indicating the current network time.

9. Method according to claim 8, furthermore comprising the step of
   g) after the step of using an internal clock for generating time information, resynchronizing to the common network time upon again receiving the current network time in said at least one device.

10. Method according to claim 1, comprising the step of
    h) generating said common network time within said binaural hearing system.

11. Method according to claim 1, comprising the step of
    i) receiving information on said common network time from a reference time base external to said binaural hearing system.

12. Method according to claim 1, comprising the step of
    n) receiving, by at least one other of said at least two devices, said message.

13. Method of operating a binaural hearing system comprising at least two devices, said method comprising the step of
    a) establishing a common network time among said at least two devices wherein at least one of said at least two devices is a hearing device; and thereafter
    m) transmitting, by a first of said at least two devices, a message, which message comprises a network time reference that refers to a specific point in time of said common network time, and, in addition, a command to be executed by the hearing device,
       wherein said network time reference is a time reference for identifying said message.

14. Method according to claim 1, wherein said transmitting of said message is carried out in form of broadcasting.

15. Binaural hearing system comprising at least two devices and means for establishing a common network time among said at least two devices wherein at least one of said at least two devices is a hearing device, wherein the binaural hearing system is structured and configured to transmit, by a first of said at least two devices and after said common network time has been established, a message, which message comprises a network time reference that refers to a specific point in time of said common network time, and, in addition, a command to be executed by the hearing device, and wherein said network time reference indicates a point in time at which said command is to be executed by said hearing device.

16. System according to claim 15, wherein said means comprise, in at least a first of said at least two devices, a transmitter adapted to transmitting information on the current network time.

17. System according to claim 16, wherein said means comprise, in at least one other of said at least two devices, a receiver adapted to receiving said information on the current network time.

18. System according to claim 15, wherein said means comprise a communication link functionally interconnecting said at least two devices.

19. System according to claim 15, wherein said means comprise a receiver for receiving information on said common network time from a reference time base external to said binaural hearing system.

20. System according to claim 15, wherein said means comprise, in at least one of said at least two devices, a timepiece for generating said common network time.

21. System according to claim 15, which comprises, in at least one of said at least two devices, an internal clock for generating time information at least approximately indicating the current network time.

22. System according to claim 15, wherein at least one of said at least two devices is a hearing aid.

23. Method according to claim 13, wherein said time reference for identifying said message is a time reference indicating the point in time of the generation of said message or of said transmitting of said message.

24. System according to claim 18, wherein said communication link functionally interconnecting said at least two devices is a wireless link.

25. Method according to claim 2, wherein the step of establishing a common network time among said at least two devices and/or the step of transmitting information on the current network time is carried out via a wireless link.

26. Method according to claim 3, wherein the step of establishing a common network time among said at least two devices is carried out via a wireless link and/or the step of transmitting information on the current network time is carried out via a wireless link.

27. Method according to claim 4, wherein the step of establishing a common network time among said at least two devices is carried out via a wireless link and/or the step of providing said at least two devices with information on the number of network time units that passed is carried out via a wireless link.

* * * * *